(12) United States Patent
Li et al.

(10) Patent No.: US 9,218,512 B2
(45) Date of Patent: Dec. 22, 2015

(54) PORTABLE COMPUTER AND OPERATING METHOD THEREOF

(71) Applicant: Quanta Computer Inc., Tao Yuan Shien (TW)

(72) Inventors: Chi-Li Li, Taoyuan County (TW); Chih-Ying Liao, Taoyuan County (TW); Chun-Hao Lien, Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 224 days.

(21) Appl. No.: 13/963,458

(22) Filed: Aug. 9, 2013

(65) Prior Publication Data

US 2014/0337969 A1    Nov. 13, 2014

(30) Foreign Application Priority Data

May 7, 2013 (TW) .............................. 102116181 A

(51) Int. Cl.
| | | |
|---|---|---|
| G06F 17/00 | (2006.01) |
| G06F 21/81 | (2013.01) |
| G06F 21/31 | (2013.01) |
| G06F 1/26 | (2006.01) |

(52) U.S. Cl.
CPC ................ *G06F 21/81* (2013.01); *G06F 21/31* (2013.01); *G06F 1/26* (2013.01)

(58) Field of Classification Search
CPC ........... G06F 1/26; G06F 21/81; G06F 21/82; G06F 21/51; G06F 21/50; G06F 21/70; G06F 21/575

See application file for complete search history.

(56) References Cited

U.S. PATENT DOCUMENTS

| | | | | |
|---|---|---|---|---|
| 6,202,161 | B1 * | 3/2001 | Wang ............................ | 713/310 |
| 2014/0115314 | A1 * | 4/2014 | Huang et al. ..................... | 713/2 |

FOREIGN PATENT DOCUMENTS

| | | |
|---|---|---|
| CN | 102955921 A | 3/2013 |
| TW | 320697 B | 11/1997 |
| TW | 200825902 A | 6/2008 |

* cited by examiner

*Primary Examiner* — Eleni Shiferaw
*Assistant Examiner* — Paul Callahan
(74) *Attorney, Agent, or Firm* — Rabin & Berdo, P.C.

(57) ABSTRACT

A portable computer and an operating method thereof are provided. The portable computer comprises an input device, a power button, a non-volatile memory, a central processing unit (CPU), an embedded controller (EC), and a chipset. The input device inputs a user password, and the non-volatile memory stores a default password. The EC, in a soft off status, determines whether the power button protection item is enabled. The EC locks the power button if the power button protection item is enabled. The EC determines whether the user password is the same as the default password. The EC unlocks the power button if the user password is the same as the default password. The chipset is coupled to the non-volatile memory, the CPU and the EC.

18 Claims, 5 Drawing Sheets

PORTABLE COMPUTER AND OPERATING METHOD THEREOF

This application claims the benefit of Taiwan application Serial No. 102116181, filed May 7, 2013, the subject matter of which is incorporated herein by reference.

BACKGROUND OF THE INVENTION

1. Field of the Invention

The invention relates in general to an electronic device, and more particularly to a portable computer and an operating method thereof.

2. Description of the Related Art

Along with the development of the information technology, computer has been widely used in many areas. Conventionally, the user manually presses a power button to start the boot process of the computer. After the power button is activated, the computer first of all loads in a basic I/O system (BIOS) to perform many tasks such as performing power-on self-test (POST), detecting hardware, installing drivers and loading in an operating system (OS).

Conventionally, any user, either a legitimate user or an illegitimate user, can manually press the power button to boot the computer. Thus, information security is severely jeopardized. Therefore, how to enhance the security of computer in terms of use has become a prominent task for the industries.

SUMMARY OF THE INVENTION

The invention is directed to a portable computer and an operating method thereof.

According to one embodiment of the present invention, a portable computer is provided. The portable computer comprises an input device, a power button, a non-volatile memory, a central processing unit (CPU), an embedded controller (EC), and a chipset. The input device inputs a user password, and the non-volatile memory stores a default password. The embedded controller (EC), in a soft off status, determines whether the power button protection item is enabled. The EC locks the power button if the power button protection item is enabled. If the power button is locked, the BIOS boot process will not be performed when the user presses the power button. The EC determines whether the user password is the same as the default password. The EC unlocks the power button if the user password is the same as the default password. The chipset is coupled to the non-volatile memory, the CPU and the EC.

According to another embodiment of the present invention, an operating method of portable computer is provided. The portable computer comprises a CPU, an EC, a non-volatile memory and a chipset. The non-volatile memory stores a default password, and the chipset is coupled to the non-volatile memory, the CPU and the EC. The operating method comprises the following steps: The EC, in a soft off status, determines whether the power button protection item is enabled. If the power button is locked, the BIOS boot process will not be performed when the user presses the power button. The EC locks the power button if the power button protection item is enabled. The EC receives the user password after the user inputs the password. The EC determines whether the user password is the same as the default password. The EC unlocks the power button if the user password is the same as the default password. The BIOS enters the boot process after the EC unlocks the power button.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
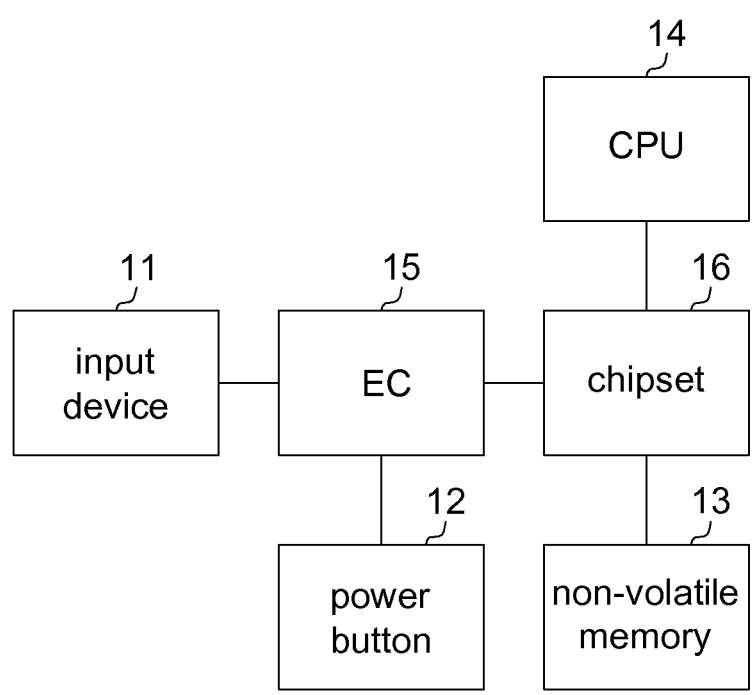
FIG. 1 shows a block diagram of a portable computer according to a first embodiment of the invention.

Referring to FIG. 1, a block diagram of a portable computer according to a first embodiment of the invention is shown. The portable computer 1, such as a tablet PC, a notebook computer or an all-in-one computer (AIO), comprises an input device 11, a power button 12, the non-volatile memory 13, a CPU 14, an embedded controller (EC) 15 and a chipset 16. The EC 15 is coupled to the input device 11 and the power button 12. The chipset 16 is coupled to the non-volatile memory 13, the CPU 14 and the EC 15. The input device 11 is such as a keyboard or a touch panel. The non-volatile memory 13 is such as a flash read-only-memory (ROM). The non-volatile memory 13 communicates with the chipset 16 such as via a serial peripheral interface (SPI) bus. The EC 15 communicates with the chipset 16 such as via a low pin count (LPC) bus. The non-volatile memory 13 stores a basic I/O system (BIOS) code, a default password and an EC code. The CPU 14 and the EC 15 read the BIOS code and the EC code respectively to perform an operating method of the portable computer 1.

Figure 2:
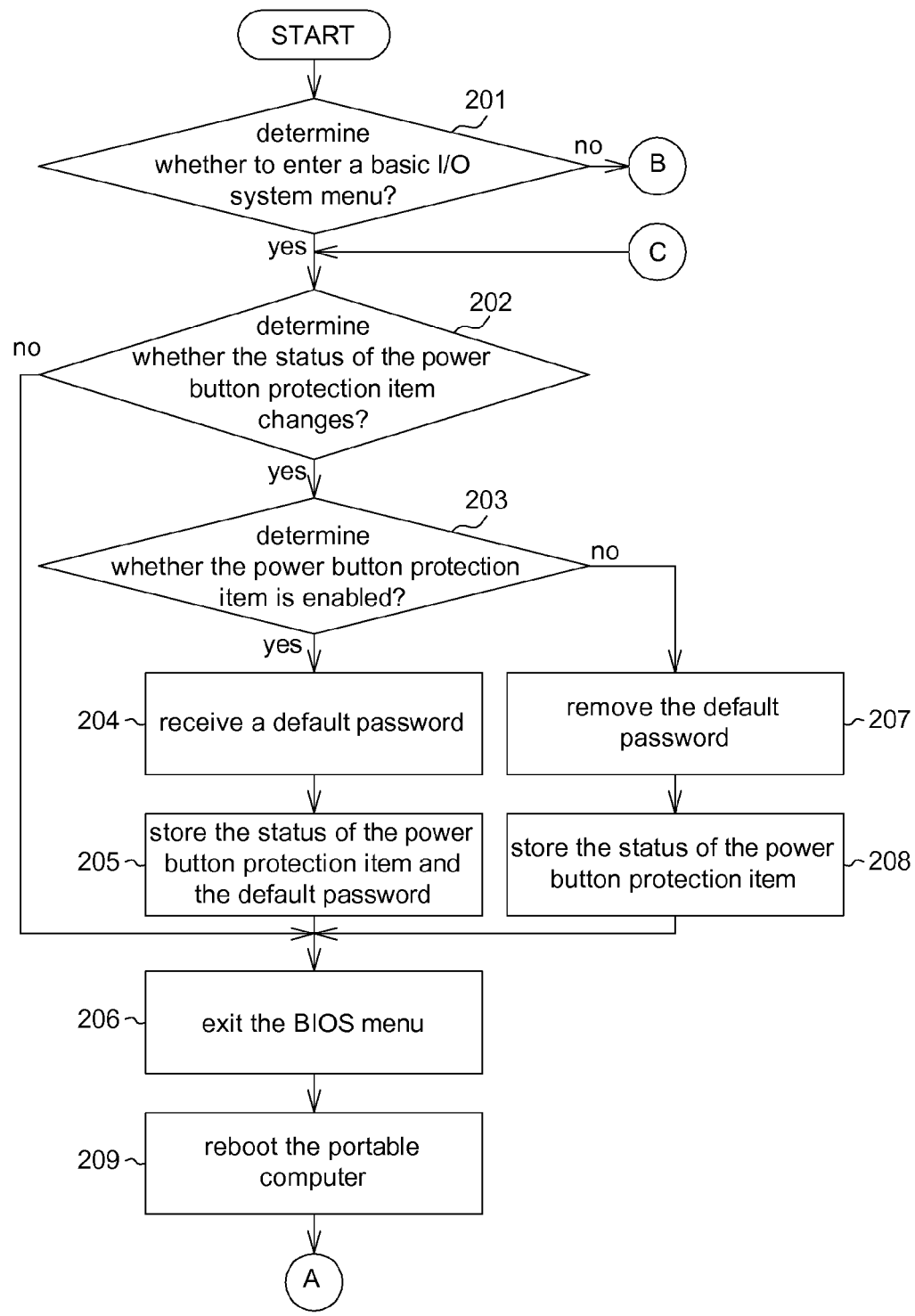
FIG. 2 and FIG. 3 show a flowchart of the processes of BIOS according to a first embodiment of the invention.
Figure 3:
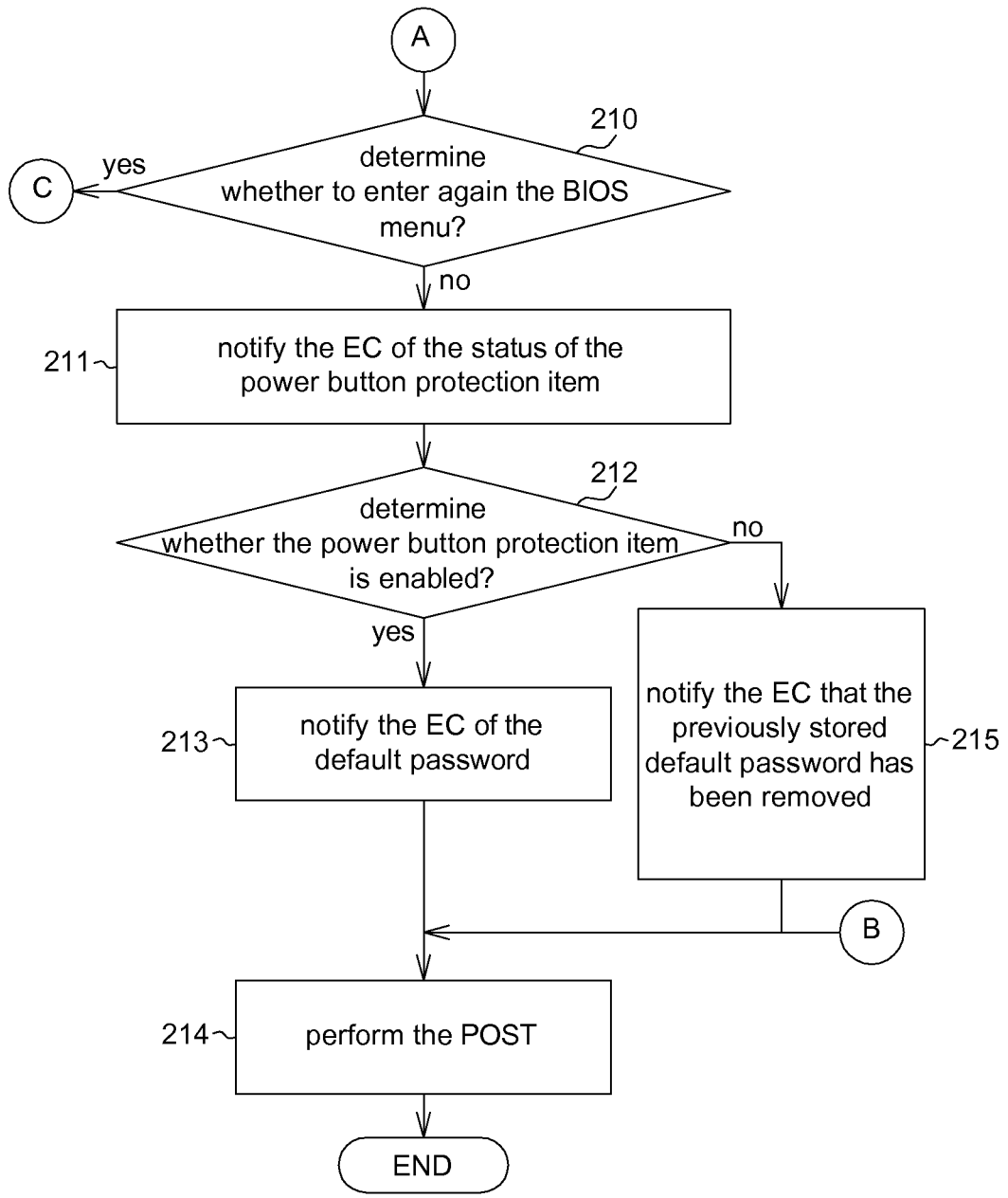

Referring to FIG. 1, FIG. 2 and FIG. 3. FIG. 2 and FIG. 3 show a flowchart of the processes of BIOS according to a first embodiment of the invention. The CPU 14 reads the BIOS code from the non-volatile memory 13 to perform the BIOS. The process of the BIOS comprises the following steps. Firstly, the process begins at step 201, the CPU 14 determines whether to enter the BIOS menu or not. If the CPU 14 does not enter the BIOS menu, then the process proceeds to step 214. In step 214, the CPU 14 performs a power on self test (POST) to check the components of the portable computer 1 and the settings thereof.

Conversely, if the CPU 14 enters the BIOS menu, then the process proceeds to step 202. In step 202, the CPU 14 determines whether the status of the power button protection item of the BIOS menu changes. For example, the power button protection item changes to a disabled status from an enabled status or the other way round. If the power button protection item does not change, then the process proceeds to step 206. In step 206, the CPU 14 exits the BIOS menu.

Conversely, if the power button protection item changes, then the process proceeds to step 203. In step 203, the CPU 14 determines whether the power button protection item is enabled. If the power button protection item is enabled, then the process proceeds to step 204. In step 204, a default password is received. The user inputs the default password via the input device 11. Then, the process proceeds to step 205, the CPU 14 stores the status of the power button protection item and the default password to the non-volatile memory 13. Meanwhile, the power button protection item is enabled.

Since the non-volatile memory still maintain data in a power mechanical off status G3, the portable computer 1, having been rebooted, can obtain the status of the power button protection item and the default password from the non-volatile memory 13. The power mechanical off status G3 is conformed to the advanced configuration and power interface (ACPI) protocol and refers to the status in which the portable computer 1 does not have any backup power supply. That is, the portable computer 1 cannot receive any backup power from municipal electricity or the battery. Meanwhile, the portable computer 1 is not equipped with any batteries and is not connected to municipal electricity via a transformer either. Then, the process proceeds to step 206, the CPU exits the BIOS menu.

Conversely, if the power button protection item is not enabled, then the process proceeds to step 207. In step 207, all previously stored default passwords are removed. Then, the process proceeds to step 208. In step 208, the CPU 14 stores the status of the power button protection item to the non-volatile memory 13. Meanwhile, the power button protection item is disabled. In step 206, the CPU exits the BIOS menu. In step 209, the portable computer 1 reboots.

Then, the process proceeds to step 210, the CPU 14 determines whether to enter again the BIOS menu. If the CPU 14 re-enters the BIOS menu, then the process proceeds to step 202 again. Conversely, if the CPU 14 does not re-enter the BIOS menu, then the process proceeds to step 211. In step 211, the CPU 14 notifies the EC 15 of the status of the power button protection item. Then, the process proceeds to step 212, the CPU 14 determines whether the power button protection item is enabled. If the power button protection item is enabled, then the process proceeds to step 213. In step 213, the CPU 14 notifies the EC 15 of the default password. Then, the process proceeds to step 214, the CPU 14 performs the POST. Conversely, if the power button protection item is not enabled, then the process proceeds to step 215. In step 215, the CPU 14 notifies the EC 15 that the previously stored default password has been removed.

The default password could be inputted by a user and reset. The default password will be cleared when the power button protection item is disabled by the user. In the other words, the user must inputs a new password to be the default password when the power button protection item was restarted.

Figure 4:
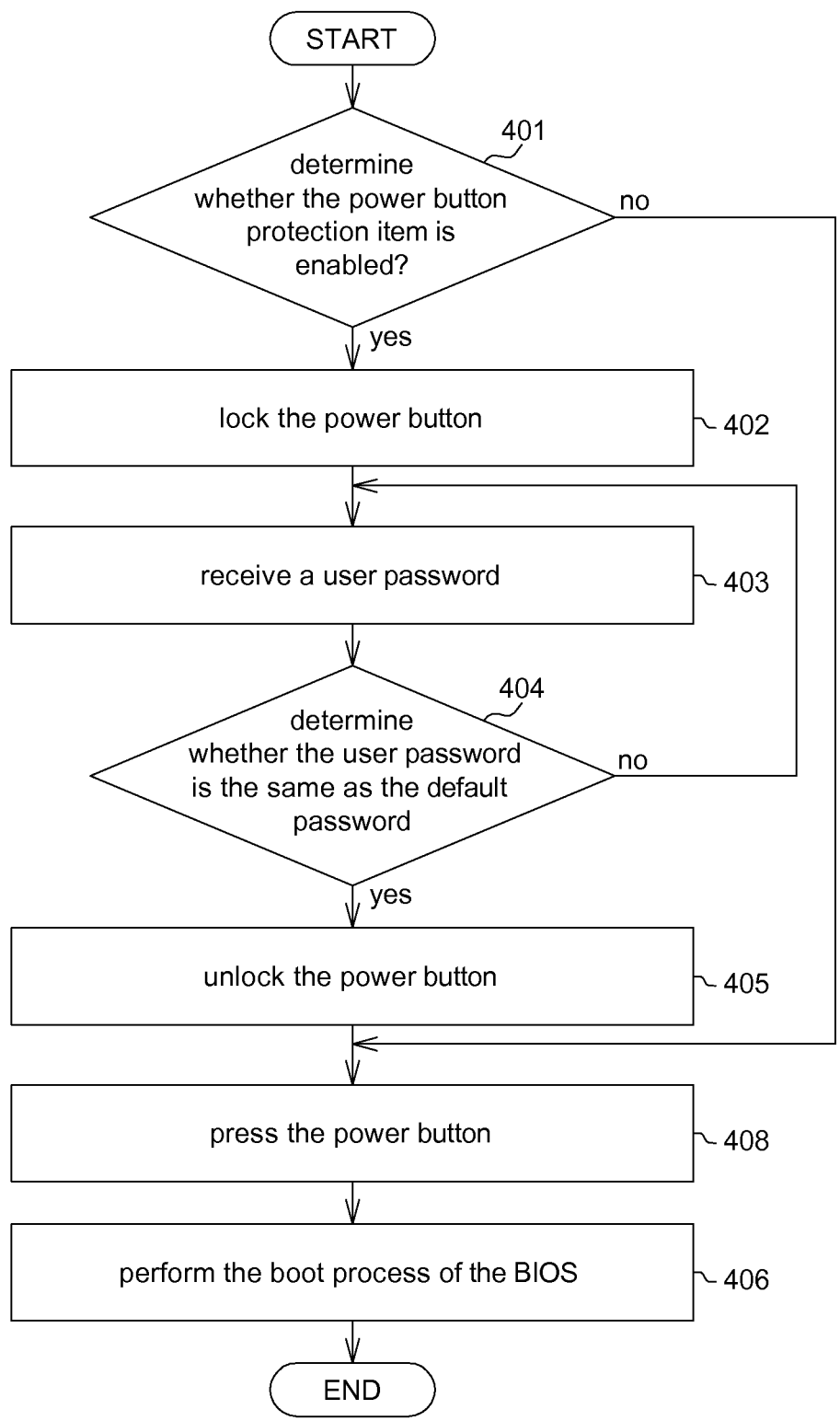
FIG. 4 shows a flowchart of the processes of EC according to a first embodiment of the invention.

Referring to FIG. 1 and FIG. 4. FIG. 4 shows a flowchart of the processes of EC according to a first embodiment of the invention. Firstly, the process begins at step 401, the EC 15, in a soft off status, determines whether the power button protection item is enabled. The soft off status S5 conformed to the advanced configuration and power interface (ACPI) refers to the status in which the portable computer 1 still has backup power supply. The portable computer 1 receives the backup power from municipal electricity via a transformer or from a battery. The system shutdown status S5 is different from the power mechanical off status G3. The power mechanical off status G3 is conformed to the advanced configuration and power interface (ACPI) protocol and refers to the status in which the portable computer 1 does not have any backup power supply. That is, in the power mechanical off status G3, the portable computer 1 cannot receive any backup power from municipal electricity or a battery. Meanwhile, the portable computer 1 is not equipped with any batteries and is not connected to municipal electricity via a transformer either. If the power button protection item is not enabled, then the process proceeds to step 408. In step 408, the user presses the power button 12. Then, the process proceeds to step 406, the EC 15 boots the BIOS after the power button 12 is pressed. It should be explained that the EC 15 still operates after the portable computer is shutdown as long as the portable computer is in a power on state. When the user presses the power button 12, the BIOS boot process is performed and the chipset 16 is controlled to provide corresponding operating voltages to components of the portable computer 1 according to a power sequence.

Conversely, if the power button protection item is enabled, then the process proceeds to step 402. In step 402, the EC 15 locks the power button 12. When the power button 12 is locked, the BIOS boot process will not be performed even when the user directly presses the power button 12. Then, the process proceeds to step 403, the EC 15 receives a user password inputted to the EC 15 via the input device 11. Meanwhile, the portable computer 1 is still in a shutdown status, therefore the computer screen does not display the user password inputted by the user. Then, the process proceeds to step 404, the EC 15 determines whether the user password is the same as the default password stored in the non-volatile memory 13. If the user password is different from the default password, then the process proceeds to step 403 again. The user needs to input a user password again, and the EC 15 correspondingly receives a new user password, and again determines whether the user password is the same as the received user password.

If the user password is the same as the default password, then the process proceeds to step 405. In step 405, the EC 15 unlocks the power button 12. Then, the process proceeds to step 408, the user presses the power button 12. Then, the process proceeds to step 406, the EC 15 performs the BIOS boot process after the power button 12 is pressed. The user password can have a fixed length or a non-fixed length. If the user password adopts a fixed length, then the input of user password is finished if the number of characters is the same as the fixed length. If the user password adopts a non-fixed length, then the user needs to press a confirmation key to indicate that the input of user password is finished.

Second Embodiment

Figure 5:
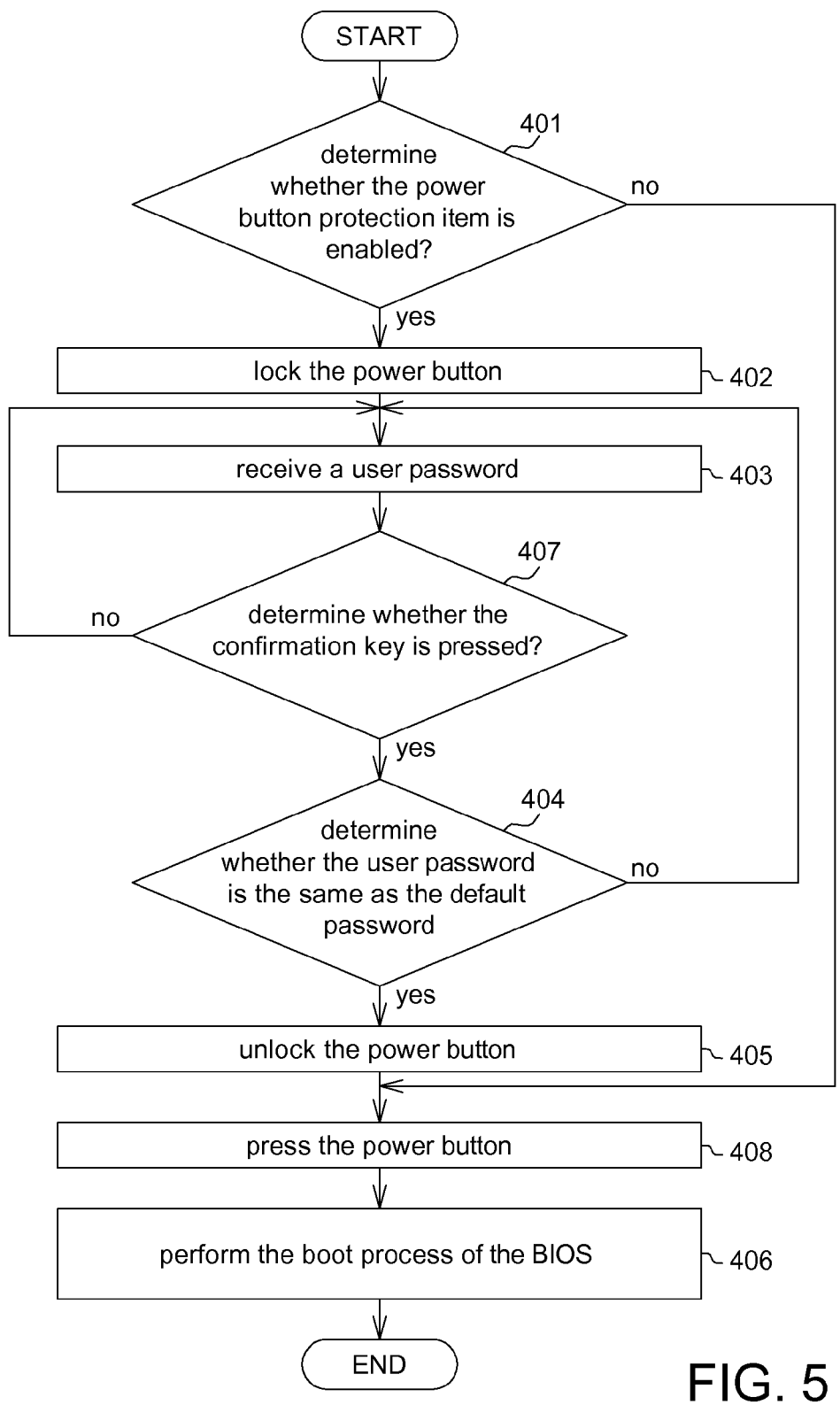
FIG. 5 shows a flowchart of the processes of EC according to a second embodiment of the invention.

Referring to FIG. 1 and FIG. 5. FIG. 5 shows a flowchart of the processes of EC according to a second embodiment of the invention. The second embodiment is different from the first embodiment mainly in that the EC 15 of the second embodiment further performs step 407 in addition to steps 401-406 and 408. If the user password adopts a non-fixed length, then step 407 needs to be performed in the wake of step 403. In step 407, the EC 15 determines whether the confirmation key is pressed. If the confirmation key is pressed, this indicates that the input of user password is finished, and the process proceeds to step 404. Conversely, if the confirmation key is not pressed, this indicates that the input of user password is not finished yet, and the process proceeds to step 403. The EC 15 continues to receive the user password. The confirmation key is such as an 'Enter' key or other keys.

It can be known from the above disclosure that the user can decide whether to enable the power button protection item of the BIOS menu. When the power button protection item is enabled, the user can input the default password via the input device 14. In order to increase the security of the portable computer 1, the power button 12 will not be unlocked unless the user password inputted by the user is the same as the default password. Moreover, the above embodiments can immediately be implemented by modifying the BIOS code and the EC code without employing any additional hardware elements, hence largely increasing the market competitiveness of the product.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable computer, comprising:
an input device for inputting a user password;
a power button;
a non-volatile memory for storing a default password;
a central processing unit (CPU);
an embedded controller (EC) for, in a soft off status, determining whether a power button protection item is enabled, wherein the EC locks the power button if the power button protection item is enabled, and the EC determines whether the user password is the same as the default password and unlocks the power button if the user password is the same as the default password; and
a chipset coupled to the non-volatile memory, the CPU and the EC;
wherein the CPU:
determines whether to enter a basic I/O system (BIOS) menu,
determines whether the status of the power button protection item changes if the CPU enters the BIOS menu,
determines whether the power button protection item is enabled if the status of the power button protection item changes, and
receives the default password and stores the status of the power button protection item and the default password to the non-volatile memory if the power button protection item is enabled.

2. The portable computer according to claim 1, wherein if the user password is not the same as the default password, then the EC receives the user password via the input device again.

3. The portable computer according to claim 1, wherein the EC, after receiving the user password, determines whether a confirmation key is pressed, and determines whether the user password is the same as the default password if the confirmation key is pressed.

4. The portable computer according to claim 3, wherein the confirmation key is a 'Enter' key.

5. The portable computer according to claim 1, wherein the EC, after receiving the user password, determines whether a confirmation key is pressed, and receives the user password via the input device again if the confirmation key is not pressed.

6. The portable computer according to claim 1, wherein if the status of the power button protection item does not change, the CPU exits the BIOS menu.

7. The portable computer according to claim 1, wherein if the power button protection item is not enabled, the CPU removes the default password, and stores the status of the power button protection item to the non-volatile memory.

8. The portable computer according to claim 1, wherein the CPU
determines whether to enter the BIOS menu again, and
notifies the EC of the status of the power button protection item if the CPU does not enter the BIOS menu again; and
determines whether the power button protection item is enabled, and notifies the EC of the default password if the power button protection item is enabled.

9. The portable computer according to claim 8, wherein the CPU notifies the EC that the default password has been removed if the power button protection item is not enabled.

10. An operating method of portable computer, wherein the portable computer comprises a central processing unit (CPU), an embedded controller (EC), a non-volatile memory and a chipset, the non-volatile memory stores a default password, the chipset is coupled to the non-volatile memory, the CPU and the EC, the operating method comprising:
determining by the EC in a soft off status whether a power button protection item is enabled;
locking a power button if the power button protection item is enabled;
receiving a user password by the EC;
determining by the EC whether the user password is the same as the default password;
unlocking the power button by the EC if the user password is the same as the default password;
determining by the CPU whether to enter a basic I/O system (BIOS) menu;
determining whether the status of the power button protection item changes if the CPU enters the BIOS menu;
determining by the CPU whether the power button protection item is enabled if the status of the power button protection item changes;
receiving the default password if the power button protection item is enabled; and
storing the status of the power button protection item and the default password to the non-volatile memory.

11. The operating method according to claim 10, wherein if the user password is not the same as the default password, the user password is received again.

12. The operating method according to claim 10, further comprising:
determining, after receiving the user password, whether a confirmation key is pressed;
wherein, whether the user password is the same as the default password is determined if the confirmation key is pressed.

13. The operating method according to claim 12, wherein the confirmation key is an 'Enter' key.

14. The operating method according to claim 10, further comprising:
determining, after receiving the user password, whether a confirmation key is pressed,
wherein, the user password is received again if the confirmation key is not pressed.

15. The operating method according to claim 10, wherein the CPU exits the BIOS menu and the portable computer is booted again if the status of the power button protection item does not change.

16. The operating method according to claim 10, further comprising:
removing the default password if the power button protection item is not enabled; and
storing the status of the power button protection item to the non-volatile memory.

17. The operating method according to claim 10, further comprising:
determining whether to enter the BIOS menu again;
notifying the EC of the status of the power button protection item if the CPU does not enter the BIOS menu again;

determining by the CPU whether the power button protection item is enabled; and notifying the EC of the default password if the power button protection item is enabled.

18. The operating method according to claim 17, wherein if the power button protection item is not enabled, the CPU notifies the EC that the default password has been removed.

* * * * *